(12) United States Patent
Tomihashi et al.

(10) Patent No.: US 7,067,574 B2
(45) Date of Patent: Jun. 27, 2006

(54) AQUEOUS DISPERSION COMPOSITION OF FLUORORESIN FOR COATING

(75) Inventors: Nobuyuki Tomihashi, Settsu (JP); Yoshihiro Soda, Settsu (JP); Hiromichi Momose, Settsu (JP); Koichiro Ogita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 19 days.

(21) Appl. No.: 10/484,965

(22) PCT Filed: Jul. 16, 2002

(86) PCT No.: PCT/JP02/07194

§ 371 (c)(1),
(2), (4) Date: Jan. 28, 2004

(87) PCT Pub. No.: WO03/011991

PCT Pub. Date: Feb. 13, 2003

(65) Prior Publication Data

US 2004/0242753 A1 Dec. 2, 2004

(30) Foreign Application Priority Data

Jul. 30, 2001 (JP) .............................. 2001-229706

(51) Int. Cl.
C08L 27/12 (2006.01)
C08L 27/18 (2006.01)
C08L 27/20 (2006.01)

(52) U.S. Cl. ...................... 524/376; 524/387; 524/388; 524/520

(58) Field of Classification Search ................ 428/339, 428/421, 422; 524/376, 387, 388, 520
See application file for complete search history.

(56) References Cited

U.S. PATENT DOCUMENTS

| 4,123,401 A | 10/1978 | Berghmans et al. |
| 4,587,286 A | 5/1986 | Wilkinson |
| 5,817,419 A * | 10/1998 | Fryd et al. ................... 428/422 |
| 6,153,688 A * | 11/2000 | Miura et al. ................ 524/546 |

FOREIGN PATENT DOCUMENTS

| EP | 0 614 941 | 9/1994 |
| JP | 5-43832 A | 2/1993 |
| WO | WO 94/05729 A1 | 3/1994 |
| WO | WO 99/43750 A1 | 9/1999 |

OTHER PUBLICATIONS

English translation of RU 2,039,069, Jul. 1995.*
Winslow et al., Polymer Eng. & Sci., vol. 6, p. 273-278, Jul. 1966.*
International Search Report for PCT/JP02/07194 dated Nov. 12, 2002.
Supplementary European Search Report for EP 02 74 6078 dated Sep. 1, 2004.
Database WPI, Section Ch, Week 199613, Derwent Publications Ltd., London, GB; AN 1996-127601, XP002293169 & RU 2 039 069 C1 (SANNIKOV S G), Jul. 9, 1995.
http://website.lineone.net/~mwarhurst/apeintro.html Oct. 1999.

* cited by examiner

Primary Examiner—Ramsey Zacharia
(74) Attorney, Agent, or Firm—Sughrue Mion, PLLC

(57) ABSTRACT

The present invention relates to an aqueous dispersion composition of fluororesin for coating comprising (A) fluororesin particles, (B) a nitrogen-free high boiling point polyol having a boiling point of at least 100° C. and containing at least 2 hydroxyl groups, (C) depolymerizable acrylic resin particles having a decomposition and vaporization temperature within a temperature range of up to the decomposition temperature of said fluororesin particles, (D) a nonionic surfactant, and (E) an aqueous medium, wherein the high boiling point polyol (B) and the depolymerizable acrylic resin particles (C) are respectively contained in an amount of 5 to 18 parts by mass and 5 to 25 parts by mass based on 100 parts by mass of fluororesin particles (A) and an oxidant and an amine-type solvent are not contained. This composition is an aqueous dispersion composition of fluororesin for coating, which has favorable storage stability, can be coated thickly, controls development of mud crack and can form a coating film in which cracking and coloring do not occur when baking. Also, the composition controls discharge of endocrine disrupter substances as much as possible.

6 Claims, No Drawings

AQUEOUS DISPERSION COMPOSITION OF FLUORORESIN FOR COATING

TECHNICAL FIELD

The present invention relates to an aqueous dispersion composition of fluororesin for coating, in which mud crack does not develop and coloring when baking does not occur.

BACKGROUND ART

When conventional aqueous dispersion compositions of fluororesin for coating are coated to the surface of an object and then dried, the coating film shrinks due to evaporation of the solvent or water and cracking occurs. That is, development of mud crack often occurs.

As suggested in WO97/40112, in order to prevent mud crack, a specific polyether urethane resin is used as an auxiliary for forming film. However, although mud crack is decreased, because thermal decomposition of the urethane groups is insufficient by the baking temperature and time suitable for a fluororesin coating film, undecomposed residue remains in the coating film, causing problems such as coloring of the obtained melted coating film.

In order to remove such tar-like undecomposed urethane resin, WO99/21927 suggests a method of also using an oxidant. However, in such a case, the oxidant remains in the melted coating film, causing deterioration of the melted coating film to progress, and in the case that carbon is present as pigment, there was the problem that the carbon is oxidized and bleached. This problem has a large effect particularly on large processed articles having a great deal of remaining heat.

JP-A-50-88128, JP-A-51-60243 and JP-A-52-13531 suggest using depolymerizable acrylic resin particles as an auxiliary for forming film. The aqueous dispersion compositions described therein require triethanol amine, which is a high boiling point solvent, to prevent mud crack, but are problematic in that the obtained melted coating film is colored a great deal, as nitrogen atoms are included. In order to prevent coloring, an oxidant is required as above and problems such as deterioration of the coating film and bleaching of the pigment, which are caused by the oxidant, remain unsolved.

The present inventors have conducted intensive research to find a composition which fulfills both prevention of mud crack and prevention of coloring when baking.

As described above, conventionally, for preventing mud crack, known is the method of adding a high boiling point solvent such as triethanolamine and diethanolamine and a long chain aliphatic acid, such as caprylic acid, capric acid and oleic acid, which is liquid at room temperature and nonvolatile. However, when the high boiling point solvent and the long chain aliphatic acid are added in an amount effective for preventing mud crack, the high boiling point solvent and the long chain aliphatic acid react when baking, becoming a substance which colors the coating film. As a result, an oxidant must be added. However, when an oxidant is added, although most of the high boiling point solvent and the long chain aliphatic acid decompose at the melting point of the fluororesin or lower and the coloring substance can be decreased, development of shrinkage crack which occurs when baking cannot be prevented.

As another method, there is the method of simultaneously preventing mud crack and thermal shrinkage by adding a water-soluble high boiling point solvent which dissolves acrylic resin particles, such as butyl diglycol and dipropylene glycol methyl ether, and then melting the acrylic resin particles when drying. However, the water-soluble high boiling point solvent decreases the emulsifying properties of the nonionic surfactant which is added as a dispersant. As a result, the emulsion of fluororesin is destroyed from shearing when spray coating and problems occur such as the coating film becomes uneven and appearance of nibs occurs.

The present inventors have considered compounding a specific ratio of high boiling point polyol and depolymerizable acrylic resin particles into an aqueous dispersion composition of fluororesin for coating, in which fluororesin particles are dispersed by a nonionic surfactant. The present inventors have found that although mud crack can be prevented by high boiling point polyol alone, cracking by thermal shrinkage cannot be prevented without an acrylic resin binder and mud crack cannot be prevented by particles of decopolymerizable acrylic resin alone and also that the desired effects can only be obtained when both of the above are used together in a specific compounding ratio. Furthermore, the present inventors have found that even when an oxidant is not added, prevention of both mud crack and coloring when baking can simultaneously be obtained and a melted coating film with excellent appearance can be provided. Thus the present invention was completed.

DISCLOSURE OF INVENTION

That is, the present invention relates to an aqueous dispersion composition of fluororesin for coating comprising: (A) fluororesin particles, (B) a nitrogen-free high boiling point polyol having a boiling point of at least 100° C. and containing at least 2 hydroxyl groups, (C) depolymerizable acrylic resin particles having a decomposition and vaporization temperature within a temperature range of up to the decomposition temperature of the fluororesin particles, (D) a nonionic surfactant and (E) an aqueous medium; wherein the high boiling point polyol (B) and the depolymerizable acrylic resin particles (C) are respectively contained in an amount of 5 to 18 parts by mass (hereinafter referred to as "part(s)") and 5 to 25 parts by mass based on 100 parts by mass of fluororesin particles (A) and an oxidant and an amine-type solvent are not contained.

The reason that the composition of the present invention can achieve prevention of both mud crack and cracking by thermal shrinkage lies in that the high boiling point polyol functions to prevent mud cracking from occurring, by remaining within the coating film even after water has vaporized when drying the coating film, and to prevent the state in which voids develop from occurring, by remaining until the depolymerizable acrylic resin particles begin thermal fusion when drying or baking. Also, the depolymerizable acrylic resin particles are thought to control thermal shrinkage of the coating film, by gradually decomposing from when baking begins while functioning as a binder until the fluororesin particles are thermally fused. Furthermore, these substances do not cause coloring, as the substances are completely decomposed and evaporated before baking is completed. Therefore, using an oxidant can be avoided. Also, shrinkage when drying and baking can be controlled, so a thick coating film (thick coating properties) can be obtained by one coat.

In the composition of the present invention, glycerin is particularly preferably as the high boiling point polyol (B).

As the nonionic surfactant (D), a nonionic surfactant represented by formula (I):

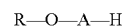

(wherein R is a linear or a branched alkyl group having 9 to 19 carbon atoms, preferably 10 to 16 carbon atoms; A is a polyoxyalkylene chain having 4 to 20 oxyethylene units and 0 to 2 oxypropylene units) is preferable. Of these, a nonionic surfactant which is represented by formula (II):

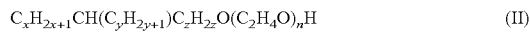

(wherein x is an integer of at least 1, y is an integer of at least 1, z is 0 or 1 and x+y+z is an integer of 8 to 18, n is an integer of 4 to 20) and has an HLB value of 9.5 to 16 and/or a nonionic surfactant represented by formula (III):

(wherein x is an integer of 8 to 18 and A is a polyoxyalkylene chain having 5 to 20 oxyethylene units and 1 to 2 oxypropylene units) is suitably used.

The content of alkylphenol, which is considered to be one kind of endocrine disrupter, is preferably kept to at most 0.1 ppm.

As the fluororesin particles, polytetrafluoroethylene (PTFE) particles, tetrafluoroethylene-perfluoro (alkyl vinyl ether) copolymer (PFA) particles, tetrafluoroethylene-hexafluoropropylene copolymer (FEP) particles, or at least two thereof may suitably be used.

In the present invention, the problem of bleaching of pigment does not occur because an oxidant is not used. Also, at least one inorganic material (F) selected from the group consisting of pigment, mica particles, mica particles coated with pigment and metal flakes may be added. The mass ratio of fluororesin particles (A) and inorganic material (F) is preferably 20/80 to 0.2/99.8.

The present invention also relates to a coated article having as a top coat layer, a melted coating film having a thickness of at least 20 µm, obtained by coating and then baking the above aqueous dispersion composition of fluororesin for coating.

BEST MODE FOR CARRYING OUT THE INVENTION

Each component of the aqueous dispersion composition of the present invention is described below.

(A) Description of Fluororesin Particles

Examples of the fluororesin particles used in the present invention are PTFE particles, FEP particles, PFA particles, ethylene-tetrafluoroethylene copolymer (ETFE) particles and ethylene-chlorotrifluoroethylene copolymer (ECTFE) particles obtained by emulsion polymerization. Of these, particles of PTFE, FEP and PFA, which are perfluoro polymers, suitably used for nonadhesive uses in kitchens and household electronic appliances, are preferably employed. The PTFE may be modified with a small amount of a comonomer. Furthermore, particles obtained by copolymerizing the same kind or different kind of monomer by seed polymerization and particles with a core-shell structure may be used.

The number average molecular weight of the fluororesin is preferably $2 \times 10^4$ to $1 \times 10^7$, particularly $2 \times 10^5$ to $8 \times 10^6$. When the number average molecular weight is less than $2 \times 10^4$, the coating film tends to become brittle and when the number average molecular weight is more than $1 \times 10^7$, the melt viscosity becomes too high and fusion of the particles tends to become difficult.

The number average molecular weight of PTFE can be found by measuring according to the method described in "Journal of Applied Polymer Science", volume 17, pages 3253 to 3257 (1973). The number average molecular weight of FEP can be found by measuring the melt flow rate (MFR) according to the method described in ASTM D2116 to find the melt viscosity (MV) from the following equation (1) and then finding the number average molecular weight (Mn) from equation (2).

Equation (1):

$$MV = \frac{\pi \times \text{applied pressure}(\text{kgf} \cdot \text{mm}^2) \times \text{orifice diameter (mm)}}{8 \times MFR \times \text{orifice diameter (mm)}}$$

Equation (2):

$$Mn = 3.4 \sqrt{\frac{MV}{162 \times 10^{-13}}}$$

As the fluororesin particles, fine particles (fluororesin aqueous dispersion) prepared by a method such as emulsion polymerization of fluoro monomers may be used as they are. The average particle size thereof is preferably 0.01 to 100 µm, particularly 0.1 to 5 µm. When the average particle size is less than 0.01 µm, film forming properties tend to decrease and when the average particle size is more than 100 µm, clogging tends to occur in the gun nozzle used for coating.

In the present invention, the aqueous dispersion of the fluororesin particles obtained by emulsion polymerization or the powdery particles obtained from this aqueous dispersion may be used. However, in the case of powder, handling properties may become poor due to electric rebound of the particles and so preferably the aqueous dispersion is used. The concentration of fluororesin solid content within the fluororesin dispersion is preferably 20 to 80% by mass, particularly 40 to 70% by mass, from the viewpoint that stability and the subsequent coating film forming properties are favorable. In the phase for preparing the aqueous dispersion composition of the present invention, the concentration of solid content can be adjusted accordingly.

(B) Polyol

The function of the high boiling point polyol used in the present invention is to prevent development of mud crack when drying the aqueous dispersion composition of the present invention after application. The aqueous dispersion composition which is applied is usually dried at room temperature to 150° C. When drying, water evaporates first. However, unless evaporation does not occur at the drying temperature or high boiling point polyol which has a evaporation speed slower than water is also used, the water evaporates before the depolymerizable acrylic resin particles soften and space develops between the resin particles, which becomes a cause of mud crack.

As a result, depending on the drying temperature and kind of high boiling point polyol (particularly the boiling point of the polyol), the inside of the dried coating film is in (1) a state in which both high boiling point polyol and depolymerizable acrylic resin particles are present, (2) a state in which high boiling point polyol hardly remains and depolymerizable acrylic resin is melted to fix the fluororesin particles, or (3) a state in which both of the above are coherent.

The polyol used in the present invention is one which does not contain nitrogen atoms and has at least 2 hydroxyl groups and a boiling point of at least 100° C. (but higher than the temperature at which melting by heat begins (softening point) of the depolymerizable acrylic resin). Polyol containing nitrogen atoms are not preferable as coloring is caused by thermal decomposition when baking. The reason the boiling point is to be at least 100° C. is because the polyol must evaporate before water when drying, but remain in the coating film after drying. Preferably, the boiling point is at least the drying temperature, more preferably at least 150° C., most preferably at least 200° C. Furthermore, the polyol must have at least 2 hydroxyl groups. Those having one or none are inferior in hydrophily in the case of substances with a boiling point of at least 100° C. and therefore, homogeneously mixing is difficult. The preferable number of hydroxyl groups is 2 to 3. Polyol having 4 or more hydroxyl groups is often a solid in room temperature and the effect of preventing mud crack may not be obtained.

Also, the polyol used in the present invention must ultimately be completely evaporated or completely decomposed and evaporated by the heat from baking described below. Therefore, polyol with a boiling point or thermal decomposition temperature which is at most the melting point of the fluororesin, more preferably at most 340° C., is preferable.

Examples of suitable polyols are one or at least two kinds of ethylene glycol (boiling point: 198° C.), 1,2-propanediol (188° C.), 1,3-propanediol (214° C.), 1,2-butanediol (190° C.), 1,3-butanediol (208° C.), 1,4-butanediol (229° C.), 1,5-pentanediol (242° C.), 2-butene-1,4-diol (235° C.), glycerin (290° C.), 2-ethyl-2-hydroxymethyl-1,3-propanediol (295° C.) and 1,2,6-hexanetriol (178° C./5 mmHg). Of these, glycerin is advantageous in view of cost and safety.

Also, organic solvents other than polyol may also be used according to need within a range in which the effects of the present invention are not lost. Examples of the organic solvent are aromatic hydrocarbon solvents such as toluene and xylene and aliphatic hydrocarbon solvents having 9 to 11 carbon atoms. The amount of the polyol (B) is 5 to 18 parts, more preferably 7 to 15 parts, most preferably 7 to 12 parts, based on 100 parts of the fluroresin particles (solid content). When the amount is less than 5 parts, the effect of preventing development of mud crack becomes weak and when the amount is more than 18 parts by weight, the coating film may become clouded.

(C) Depolymerizable Acrylic Resin Particles

When baking the aqueous dispersion composition of the present invention after applying and drying, the depolymerizable acrylic resin particles used in the present invention gradually decompose while maintaining the binder effect to fluororesin particles and development of shrinkage crack is prevented. Therefore, the depolymerizable acrylic resin particles must be melted and begin depolymerizing at the melting point of the fluororesin or lower, must remain at least partially at the melting point of the fluororesin particles and must be decomposed and evaporated almost completely at the baking temperature.

When the dried coating film is heated, first, evaporation or decomposition and evaporation of the remnant polyol and melting by heat of the depolymerizable acrylic resin particles begin. The polyol must remain until melting by heat of the depolymerizable acrylic resin particles is completed. When the temperature rises further, as soon as evaporation or decomposition of the remnant polyol is completed, depolymerization of the depolymerizable acrylic resin melted by heat begins. The depolymerization of the depolymerizable acrylic resin gradually starts from the melting point of the fluororesin or lower, but is not yet completed at the temperature at which the fluororesin particles begin melting by heat (melting point) and is completed when the temperature becomes the baking temperature, which is higher than the melting point of the fluororesin. As a result, a large amount of the depolymerizable acrylic resin remaining within the obtained fluororesin coating film can be avoided. Because the depolymerizable acrylic resin has viscosity when melted by heat and depolymerization progresses gradually, when the fluororesin particles melt and fuse, sudden shrinkage does not occur and development of thermal shrinkage crack can be controlled.

Therefore, the depolymerizable acrylic resin particles are preferably particles which remain until the temperature at which the fluororesin particles begin melting (melting point), even when depolymerization begins from the melting point of the fluororesin or lower, and which decompose and evaporate at the baking (processing) temperature. For example, particles which remain in an amount of at least 5%, particularly at least 10%, and at most 50%, particularly at most 20%, at the melting point of fluororesin (usually 240° to 345° C.), remain in an amount of at most 10%, particularly at most 5%, at the baking (processing) temperature (usually higher than the melting point of fluororesin and up to 415° C., preferably 360° to 400° C.) and substantially do not remain when baking is completed, are preferable. From the above, the depolymerization (decomposition) temperature of the depolymerizable acrylic resin particles is approximately at least 200° C. and less than the baking (processing) temperature of fluororesin, particularly at most the melting point of the fluororesin. In the case of acrylic resin particles which have a depolymerization (thermal decomposition) temperature higher than the melting point of the fluororesin and which generate a large amount of decomposition gas, coating film defects such as pinholes tend to occur in the obtained coating film.

Particularly, regardless of the kind of resin, depolymerizable acrylic resin which remains in an amount of approximately 25 to 50% in a temperature range of 300° to 320° C. and in an amount of approximately 20 to 10% in a temperature range of 330° to 345° C. is suitable, in view of balance in the function of preventing shrinkage crack and the function of preventing coloring. As long as the depolymerizable acrylic resin particles fulfill these conditions, the particles can be used, whether the fluororesin is PTFE or PFA.

Generally, regarding depolymerizability, as described in "Polym. Eng. Sci., Vol. 6, p. 273 (1966)", "Plast. Massy., Vol. 75, p. 48 (1971)" and "Deterioration of Polymer Material", Corona Publishing Co., Ltd., p. 144. (1958), C—C bonds and C—H bonds weaken the more the number of branches within the polymer chain and then the polymer chain is oxidized and decomposed, becoming easily depolymerized. More specifically preferable examples of depolymerizable acrylic resin are a methacrylic homopolymer or copolymer to which a methacrylic monomer represented by formula (IV) is essential:

$$CH_2=C(CH_3)COOR \qquad (IV)$$

(wherein R is an alkyl group or a hydroxyalkyl group having 1 to 5 carbon atoms). As the methacrylic monomer, methyl methacrylate, ethyl methacrylate, propyl methacrylate, dimethyl propyl methacrylate, butyl methacrylate and pentyl methacrylate are suitably employed. Of these, a depolymerizable acrylic resin in which butyl methacrylate is used as a monomer is preferable, from the viewpoint that the glass transition temperature is low and depolymerizability (decomposition properties) is favorable.

There is no problem when a stable emulsion can be formed with a homopolymer, but from the viewpoint of stabilizing the emulsion, a monomer having a carboxyl group or a hydroxyl group can suitably be used as the comonomer.

As the depolymerizable acrylic resin particles, fine particles prepared by a method such as emulsion polymerization (depolymerizable acrylic resin emulsion) can be used as they are and the average particle size thereof is preferably 0.1 to 100 μm, particularly 0.2 to 1 μm. When the particle size is less than 0.1 μm, mud crack tends to develop and when the particle size is more than 100 μm, coating tends to become difficult.

The amount of depolymerizable acrylic resin particles (C) is 5 to 25 parts, preferably 7 to 20 parts, more preferably 10 to 15 parts based on 100 parts of the fluororesin particles (solid content). When the amount is less than 5 parts, forming a film of fluororesin becomes difficult and when more than 25 parts, coloring of the coating film tends to occur.

The depolymerizable acrylic resin particles are preferably mixed with the other components in the form of an emulsion.

(D) Nonionic Surfactant

In the present invention, the nonionic surfactant is necessary from the viewpoint of dispersing the fluororesin particles within the aqueous dispersion composition with stability. Also, the nonionic surfactant is used from the viewpoint of preventing coloring in the coating film caused by decomposition and evaporation when baking (processing).

Examples of the nonionic surfactant are polyoxyethylene alkylphenol-type surfactants (e.g.Triton X (product name) available from Union Carbide Corporation) and polyoxyethylene alkylether-type nonionic surfactants with natural alcohol as the raw ingredient.

However, a polyoxyethylene alkylphenolether-type surfactant thermally decomposes in the baking step and generates toxic aromatic compounds (e.g. benzene, toluene, xylene) as decomposition gas, causing air pollution. Also, in an alkylphenol-type nonionic surfactant, unreacted alkylphenol (endocrine disrupting substance, i.e. endocrine disrupter) may remain in an extremely small amount. In view of these points, a nonphenol-type nonionic surfactant which does not contain a benzene ring within its structure is preferable. Particularly, regardless of its origin, the content of alkylphenol is desired to be at most 0.1 ppm, preferably to be nonexistent, in view of the environment.

An example is the polyoxyalkylene alkyl ether-type nonionic surfactant of the above formula (I) and examples of the particularly preferable nonphenol-type nonionic surfactants are the polyoxyethylene alkyl ether-type surfactants represented by the above formulas (II) and (III). In view of dispersing the fluororesin particles with stability, the HLB values thereof are preferably 9.5 to 16, particularly 12 to 14.

The amount of the nonionic surfactant to be added is an amount which can stabilize the dispersion state of the aqueous dispersion composition for coating of the present invention and is preferably 6 to 10% by mass, particularly 7 to 9% by mass based on the fluororesin particles.

The nonionic surfactant is a substance for stabilizing the final aqueous dispersion composition for coating and can be added in advance to the aqueous dispersion of fluororesin particles (A) or the emulsion of the depolymerizable acrylic resin particles (C) or can be added after mixing these components.

(E) Aqueous Solvent

The aqueous solvent is used as the liquid medium of the aqueous dispersion composition for coating and adjusts the solid content concentration of the composition. Water can be used alone or an aqueous mixed solvent, in which water and a water-soluble compound are used together, may be used.

The above are the components essential to the aqueous dispersion composition for coating of the present invention. In the present invention, other additives may be compounded further according to need.

(F) Inorganic Material

Examples of the inorganic filler other than pigment are mica particles, mica particles coated with pigment, metal flakes and at least two of these inorganic fillers. These may be compounded in an amount within the range in which the effects of the present invention are not lost.

As the pigment, various conventionally known pigments can be used and examples are titanium oxide, carbon black and colcothar. The present invention is superior in that, of these, carbon black, which was conventionally bleached by influence of the oxidant, can be used at ease.

The inorganic filler is a substance which imparts the function of improving abrasion resistance and mica is preferable in view of providing beautiful appearance. The particle size of the mica particles is 10 to 100 μm, preferably 15 to 50 μm. When the particle size is less than 10 μm, abrasion resistance and photoluminescence tend to decline and when the particle size is more than 100 μm, non-adhesiveness tends to decrease. Mica particles coated with pigment are obtained by adhering pigment such as $TiO_2.Fe_2O_3$ to the mica particles by sintering deposition. Examples of the metal flakes are flakes of titanium, zirconium, aluminum, zinc, antimon, tin, iron and nickel. Of these, in view of difficulty in rusting, titanium and zirconium are preferable. Regarding size, those with a size in the range usually used in coatings can be used.

Also, various other known additives may be compounded as long as the effects of the present invention are not lost. Examples are a defoaming agent, a desiccant, a thickening agent, a leveling agent and an anticrawling agent.

Examples of the defoaming agent are toluene, xylene, a nonpolar solvent such as a hydrocarbon-type having 9 to 11 carbon atoms and silicone oil.

An example of the desiccant is cobalt oxide.

Examples of the thickening agent are methyl cellulose, polyvinyl alcohol and carboxylated vinyl polymer.

In the composition of the present invention, the above effects can be obtained without compounding an amine-type solvent and an oxidant. However, in the specific embodiments, adding an amine-type solvent is not excluded, as long as the amount does not cause coloring, and adding an oxidant is not excluded, as long as the amount does not cause deterioration of the coating film.

In addition to fluororesin particles (A), solid content such as depolymerizable acrylic resin particles (C) and inorganic material (F) are included in the aqueous dispersion composition of fluororesin for coating of the present invention and the amount of the solid content is preferably 20 to 80% by mass, particularly 30 to 70% by mass. When the solid content concentration is less than 20% by mass, forming a thick film by one coat tends to be difficult and when the solid content concentration is more than 80% by mass, the viscosity of the coating becomes high and spray coating may become difficult.

Preparation of the aqueous dispersion composition of fluororesin for coating of the present invention can be conducted by the usual method. For example, in a fluororesin aqueous dispersion in which fluororesin particles (A) are dispersed in aqueous medium (E) by nonionic surfactant (D), polyol (B), emulsion of depolymerizable acrylic resin particles (C) and, if necessary, inorganic material (F) and other additives are added and mixed by stirring at 5 to 30° C. for 10 to 40 minutes to prepare the aqueous dispersion composition. The solid content concentration can be controlled by adding aqueous medium (E).

The aqueous dispersion composition of fluororesin for coating of the present invention is useful as a coating, particularly a top coat coating. As the coating method, various conventional coating methods may be employed. Examples are dipping method, spray method, roll coat method, doctor blade method and flow coat method.

The composition for coating of the present invention can be applied directly to the substrate but preferably, in order to improve adhesion, a primer layer is provided and a top coat layer is formed. The substrate is not particularly limited but various metals, porcelain enamel, glass and various ceramics can be employed. In order to improve adhesion, the surface is preferably roughened by sand blasting.

The composition for coating which is applied to the substrate is then dried. The composition of the present invention is characterized in that mud crack does not occur at this step of drying. Drying is conducted under the usual conditions and although depending on the boiling point of the polyol which is used, when conducted at room temperature to 150° C., more preferably 80 to 150° C., for 5 to 20 minutes, set to touch is achieved.

The dried coating film is baked (processed). According to the composition of the present invention, the depolymerizable acrylic resin functions as a binder until the fluororesin particles melt and fuse and so development of cracking caused by thermal shrinkage in the baking step can be prevented. The baking (processing) temperature and time differ according to the kind and melting point of the fluororesin, but baking is conducted at the melting point of fluororesin or higher, usually 360° to 415° C., for 5 to 30 minutes. In the case of PTFE, baking at 360° to 380° C. for 10 to 30 minutes is suitable.

When a primer layer is provided, the method of applying, drying and baking the primer layer and then applying, drying and baking the composition of the present invention (2 coat 2 bake method) or the method of applying and drying the primer layer, applying and drying the composition of the present invention and then simultaneously baking both layers (2 coat 1 bake method) may be employed.

According to the aqueous dispersion composition of fluororesin for coating of the present invention, a thick coating film of which the film thickness of the melted coating film is at least 30 µm can be obtained by coating once. The upper limit is not particularly limited but when the coating film is too thick, various kinds of decomposed residue remain in the coating film, which becomes a cause of coloring, so the limit is at most 100 µm.

The composition of the present invention is most useful for metal cooking utensils, particularly for coating frying pans, but the composition can be also used for coating other products which require corrosion resistance. Examples of such products are a bearings, valve, electric wires, metal foils, boilers, pipes, ship bottoms, oven linings, bottom plates of irons, bread pans, rice cookers, grill pans, electric pots, ice making trays, snow plow shovels, spades, chutes, conveyers, rolls, metal dies, dies, saws, files, tools such as a drill, kitchen knives, scissors, hoppers, other industrial containers (particularly for the semiconductor industry) and casting molds. The present invention also relates to such coated articles.

As the aqueous dispersion composition of fluororesin for coating of the present invention, the following combinations of the components are preferable but the present invention is not limited thereto.

[1] (A) 100 Parts of Fluororesin Particles
  (B1) 5 to 18 parts of nitrogen-free high boiling point polyol having a boiling point of at least 150° C. and containing at least 2 hydroxyl groups
  (C) 5 to 25 parts of acrylic resin particles which depolymerize and vaporize in a temperature range up to the baking temperature of fluororesin
  (D) nonionic surfactant
  (E) aqueous medium This composition can be coated thickly and form a coating film with excellent abrasion resistance, corrosion resistance and non-adhesiveness. The article to which the composition is top coated maintains long-term quality.

[2] (A) 100 Parts of Fluororesin Particles
  (B2) 5 to 18 parts of nitrogen-free high boiling point polyol having a boiling point of at least 250° C. and containing at least 2 hydroxyl groups
  (C1) 5 to 25 parts of depolymerizable methacrylate-type acrylic resin particles
  (D) polyoxyethylene alkyl ether-type nonionic surfactant
  (E) aqueous medium This composition causes little coloring in the coating film, as little sludge is remnant in the coating film, and also forms a coating film excellent in gloss, as meltable fluororesin is included. The article to which the composition is top coated maintains long-term quality. Further preferably,

[3] (A1) 100 Parts of PTFE, PFA and/or FEP Particles
  (B2) 5 to 18 parts of nitrogen-free high boiling point polyol having a boiling point of at least 250° C. and containing at least 2 hydroxyl groups
  (C1) 5 to 25 parts of depolymerizable methacrylate-type acrylic resin particles
  (D1) polyoxyethylene alkyl ether-type nonionic surfactant
  (E) aqueous medium This composition causes little coloring in the coating film, as little sludge is remnant in the coating film, and also forms a coating film excellent in gloss, as meltable fluororesin is included. Also, vapor permeability resistance is excellent, as perfluororesin is used, and the article to which the composition is top coated maintains long-term quality.

Hereinafter, the present invention is explained in detail by means of Examples, but the present invention is not limited thereto. In Examples and Comparative Examples, "part(s)" and "%" respectively represent "part(s) by mass" and "% by mass".

EXAMPLE 1

Each of the following components was mixed in the order given.

(A) PTFE aqueous dispersion (average particle size 0.3 µm, concentration of solid content 60%, containing 6% of polyoxyethylene tridecylether (ethyleneoxide 8.5 mole) based on PTFE as a dispersion stabilizer) 78.7 parts (B) glycerin 4.7 parts (C) emulsion of depolymerizable acrylic resin particles (butyl methacrylate resin, average particle size 0.3 μm, concentration of solid content 40%) 11.8 parts (D) nonionic surfactant (polyoxyethylene tridecylether, Dispanol TOG available from NOF Corporation, 20% aqueous solution) 4.7 parts (Other) thickening agent (25% aqueous solution of lauryl sodium sulfate) 1.9 parts.

Regarding the obtained aqueous dispersion composition for coating of the present invention, the following properties were examined. The results are shown in Table 1.

(Viscosity)

The viscosity at 25° C. was measured by a B-type rotating viscometer.

(Storage Stability)

500 g of the aqueous dispersion composition for coating was placed in a bottle made of polyethylene and left for 6 months in a constant bath of 40° C. The storage stability was measured by redispersability.

Evaluation was conducted using a metal net of 150 mesh and those which completely passed through were evaluated as ○ and those leaving residue on the metal net were evaluated as X.

Then, the obtained aqueous dispersion composition for coating was applied by a spraying method to a non-blast aluminum board and dried for 15 minutes at 80° C. The surface of the obtained dried coating film was observed by an optical microscope to examine whether or not mud crack had developed. Mud crack was not found.

The dried coating film was baked for 20 minutes at a temperature of 380° C. to form a melted coating film. Regarding this coating film, the following properties of the coating film were examined. The results are shown in Table 1.

(Appearance of Coating Film)

The surface of the coating film was examined by an optical microscope.

(Critical Coating Thickness for Crack)

The coating film thickness was variously changed and the coating film thickness at which crack begins to develop was assumed to be the critical coating thickness for crack.

(Coloring)

The coating film was observed visually.

(Content of Alkylphenol)

The content of alkylphenol was analyzed by liquid chromatography (column: ASAHIPAC GS-310, eluent: acetonitrile/water=50/50 volume ratio, flow rate: 1.2 ml/min, column temperature: 25° to 28° C., detection: UV (230 nm)). Those from which ultraviolet rays were not detected were evaluated as ○ and those from which ultraviolet rays were detected were evaluated as X.

EXAMPLE 2

The composition of the present invention was prepared in the same manner as in Example 1 except that the compounding ratio of (A) to (D) was (A)/(B)/(C)/(D)=70.4/4.2/21.1/4.2 (parts). The properties of this composition were examined in the same manner as in Example 1. The results are shown in Table 1.

Then, the obtained aqueous dispersion composition for coating was applied by a spraying method to a non-blast aluminum board and dried and baked under the same conditions as in Example 1 to form a melted coating film. The same properties of the coating film as in Example 1 were examined. The results are shown in Table 1.

COMPARATIVE EXAMPLES 1 to 7

The composition of the present invention was prepared in the same manner as in Example 1 except that each of the components shown in Table 1 was used in the ratio shown in Table 1. The properties of the compositions were examined in the same manner as in Example 1. The results are shown in Table 1.

Then, the composition for coating was applied by a spraying method to a non-blast aluminum board and dried and baked under the same conditions as in Example 1 to form a melted coating film. The same properties of the coating film as in Example 1 were examined. The results are shown in Table 1.

Comparative Example 1 is an example in which specific polyol (B) and emulsion of depolymerizable acrylic resin particles (C) were not compounded.

Comparative Example 2 is an example in which specific polyol (B) was not compounded.

Comparative Example 3 is an example in which 20 parts of specific polyol (B) were compounded based on 100 parts of the PTFE particles (solid content).

Comparative Example 4 is an example in which 20 parts of specific polyol (B) were compounded based on 100 parts of the PTFE particles (solid content) and 30 parts of emulsion of depolymerizable acrylic resin particles (C) were compounded based on 100 parts of the PTFE particles (solid content).

Comparative Example 5 is an example in which 20 parts of specific polyol (B) were compounded based on 100 parts of the PTFE particles (solid content) and a polyoxyethylene alkylphenol surfactant (Triton X100) was used as nonionic surfactant (D).

Comparative Example 6 is an example in which butyl diglycol (number of hydroxyl groups: 1, boiling point 230° C.) was used instead of glycerin.

Comparative Example 7 is the conventional example in which specific polyol (B) and emulsion of depolymerizable acrylic resin particles (C) were not used and alternatively, emulsion of urethane resin was compounded.

TABLE 1

|  | Ex. | | Com. Ex. | | | | | | |
|---|---|---|---|---|---|---|---|---|---|
|  | 1 | 2 | 1 | 2 | 3 | 4 | 5 | 6 | 7 |
| Composition (parts by mass) | | | | | | | | | |
| PTFE Aqueous Dispersion (60%) | 78.1 | 70.4 | 94.3 | 82.6 | 75.2 | 61.3 | 75.2 | 74.3 | 79.4 |
| Glycerin | 4.7 | 4.2 | — | — | 9.0 | 7.4 | 9.0 | — | — |
|  | (10) | (10) | (—) | (—) | (20) | (20) | (20) | (—) | (—) |

TABLE 1-continued

|  | Ex. | | Com. Ex. | | | | | | |
| --- | --- | --- | --- | --- | --- | --- | --- | --- | --- |
|  | 1 | 2 | 1 | 2 | 3 | 4 | 5 | 6 | 7 |
| Butyl Diglycol | – | – | – | – | – | – | – | 10.0 | – |
|  | (–) | (–) | (–) | (–) | (–) | (–) | (–) | (22.5) | (–) |
| Emulsion of Depolymerizable Acrylic Resin (40%) | 11.8 (10) | 21.1 (10) | – (–) | 12.4 (10) | 11.3 (10) | 27.6 (30) | 11.3 (10) | 11.2 (10) | – (–) |
| Emulsion of Urethane Resin (30%) | – | – | – | – | – | – | – | – | 15.9 |
|  | (–) | (–) | (–) | (–) | (–) | (–) | (–) | (–) | (6) |
| Dispanol TOC | 4.7 | 4.2 | 5.6 | 5.0 | 4.5 | 3.6 | — | 4.5 | 4.8 |
| Triton X | – | – | – | – | – | – | 4.5 | – | – |
| Thickening Agent | 1.9 | 2.5 | 1.1 | 2.0 | 2.7 | 4.4 | 2.7 | 1.8 | 2.9 |
| Concentration of Solid Content (% by mass) | 47.2 | 42.3 | 56.6 | 49.6 | 45.1 | 36.8 | 47.2 | 44.6 | 47.6 |
| Properties of Composition |  |  |  |  |  |  |  |  |  |
| Viscosity (cP) | 135 | 140 | 170 | 185 | 160 | 185 | 170 | 180 | 135 |
| Storage Stability | ○ | ○ | ○ | ○ | ○ | ○ | ○ | X | ○ |
| Properties of Coating Film |  |  |  |  |  |  |  |  |  |
| Mud Crack | No | No | Yes | Yes | No | No | No | No | No |
| Appearance of Coating after Baking | Normal | Normal | Cracked | Cracked | Clouded | Clouded | Clouded | Normal | Normal |
| Critical Film Thickness for Crack (μm) | 20 | 23 | 5 | 10 | 20 | 25 | 20 | 20 | 40 |
| Coloring | No | No | No | No | No | Yes | No | No | Yes |
| Presence of Endocrine Disrupter | ○ | ○ | ○ | ○ | ○ | ○ | X | ○ | ○ |

Parts based on 100 parts of PTFE particles are indicated in parentheses.

As evident from Table 1, the composition of the present invention, in which glycerin and emulsion of depolymerizable acrylic resin particles are compounded in a specific ratio, does not cause mud crack and is not colored, even though an oxidant is not used. Also, the critical coating thickness for crack is thick and alkylphenol, which is an endocrine disrupter substance, is not included.

INDUSTRIAL APPLICABILITY

The aqueous dispersion composition of fluororesin for coating of the present invention has favorable storage stability, can be coated thickly, prevents development of mud crack and can form a coating film in which mud crack and coloring do not occur when baking. Also, even when an alkylphenol-type surfactant, which has excellent properties as a nonionic surfactant but may become the source of an endocrine disrupter substance, is not used, the desired coating film can be formed without decreasing the properties of the coating film.

The invention claimed is:

1. An aqueous dispersion composition of fluororesin for coating comprising:
(A) fluororesin particles,
(B) a nitrogen-free high boiling point polyol having a boiling point of at least 100° C. and containing at least 2 hydroxyl groups,
(C) depolymerizable methacrylic resin particles having a decomposition and vaporization temperature within a temperature range of up to the decomposition temperature of said fluororesin particles,
(D) a nonionic surfactant, and
(E) an aqueous medium;
wherein said depolymerizable methacrylic resin particles (C) are particles of a homopolymer of a methacrylic monomer represented by the formula (IV):

$$CH_2=C(CH_3)COOR \qquad (IV)$$

wherein R is an alkyl group or a hydroxyalkyl group having 1 to 5 carbon atoms, or a copolymer of at least two methacrylic monomers of the formula (IV), said high boiling point polyol (B) and said depolymerizable methacrylic resin particles (C) are respectively contained in an amount of 5 to 18 parts by mass and 5 to 25 parts by mass based on 100 parts by mass of fluororesin particles (A) and an oxidant and an amine-type solvent are not contained.

2. The aqueous dispersion composition of claim 1, wherein said high boiling point polyol (B) is glycerin.

3. The aqueous dispersion composition of claim 1, wherein said nonionic surfactant (D) is a nonionic surfactant represented by formula (I):

R—O—A—H wherein R is a linear or a branched alkyl group having 9 to 19 carbon atoms; A is a polyoxyalkylene chain having 4 to 20 oxyethylene units and 0 to 2 oxypropylene units.

4. The aqueous dispersion composition of claim 1, wherein content of alkylphenol is at most 0.1 ppm.

5. The aqueous dispersion composition of claim 1, wherein said fluororesin particles are polytetrafluoroethylene particles, tetrafluoroethylene-perfluoro (alkyl vinyl ether) copolymer particles, tetrafluoroethylene-hexafluoropropylene copolymer particles, or at least two thereof.

6. The aqueous dispersion composition of claim 1, wherein said nonionic surfactant (D) is a nonionic surfactant represented by formula (I):

R—O—A—H wherein R is a linear or a branched alkyl group having 10 to 16 carbon atoms; A is a polyoxyalkylene chain having 4 to 20 oxyethylene units and 0 to 2 oxypropylene units.

* * * * *